United States Patent [19]

Kall et al.

[11] 4,157,477
[45] Jun. 5, 1979

[54] LIGHT DETECTOR PARTICULARLY ADAPTED FOR DETECTING THE POSITION OF EDGES OF MOVING STRIP

[75] Inventors: Ronald J. Kall, Brooklyn Heights; Alan R. Hoffman, Aurora, both of Ohio

[73] Assignee: North American Mfg. Co., Cleveland, Ohio

[21] Appl. No.: 840,901

[22] Filed: Oct. 11, 1977

[51] Int. Cl.² ............................................. G01N 21/30
[52] U.S. Cl. .................................................... 250/548; 250/227
[58] Field of Search ............... 250/458, 459, 460, 461, 250/548, 227

[56] References Cited

U.S. PATENT DOCUMENTS

| | | | |
|---|---|---|---|
| 2,904,700 | 9/1959 | Rockey | 250/548 |
| 3,659,102 | 4/1972 | Toriyama | 250/458 |
| 3,752,991 | 8/1973 | Slagle | 250/460 |
| 3,934,148 | 1/1976 | Collins | 250/458 |

*Primary Examiner*—David C. Nelms
*Attorney, Agent, or Firm*—Meyer, Tilberry & Body

[57] ABSTRACT

A detector for detecting the position of the edges of a moving strip which produces an electrical signal proportional to the transverse position of the strip. A light source shines on the edge of the strip. A smooth surfaced sheet of translucent plastic material containing a fluorescent pigment is placed below the edge and opposite the light source. The pigment in the portion of the sheet of the strip and exposed to the light source outside the edge fluoresces producing light energy in amounts proportional to the area of the sheet exposed to the light source. This light energy travels between the sheet surfaces to the edges of the sheet. Photoelectric sensitive means are operatively associated with the edges of the sheet for producing an electrical signal proportional to the amount of fluorescent generated light energy which signal can be amplified to control power means for respositioning the strip.

12 Claims, 4 Drawing Figures

LIGHT DETECTOR PARTICULARLY ADAPTED FOR DETECTING THE POSITION OF EDGES OF MOVING STRIP

This invention pertains to the art of light detection and more particularly to a light detector which can be used for sensing the position of the edges of moving strip material.

The invention is particularly applicable to center guide detectors for moving strip material by creating an electrical signal varying with the position of the edges which signal can be amplified and used for centering the strip and will be described with particular reference thereto although it will be appreciated that the invention has other and broader applications.

In manufacturing, it is conventional to move elongated strips of sheet material over rolls for the purposes of processing the strip. Because of slight variations in the equipment or in the strip itself, one of the major problems has been that the strip tends to wander from one side to the other and it has been necessary in the past to detect the position of the edges of the strip with a means which creates a signal which can be amplified and then used to adjust the position of the rolls to maintain the strip on an exact desired course of movement.

In the past, it has been conventional to provide a pair of bar lights located so as to shine down on each edge of the strip and then to place under the strip a pair of elongated photoelectric elements which, as the edges of the strip tend to move laterally of the line of movement of the strip, generate an electrical signal which can be amplified to cause other apparatus to take corrective action to correct the location of the moving strip.

In the past, such photosensitive elements have consisted of either photovoltaic cells or photoresistive cells. These cells are normally provided in relatively short or small discrete lengths and it has been necessary to provide a series of such cells in end to end relationship to provide the elongated photsensitive element necessary for edge detection. One of the principal problems with such cells is that despite the extreme care used in their manufacture, they all have slight variations one from the other and heretofore, it has been necessary to match the various cells using highly sophisticated techniques so that the variations in the signals generated as the strip moves from one side to the other will be uniform, linear and predictable. The matching of these cells has proven to be a highly laborious, expensive and time consuming operation.

The present invention contemplates a new and improved light detector which overcomes all of the above referred to difficulties and provides a signal which can be made to vary linearly with the position of the strip and which does not require the expensive matching procedures of the prior art.

In accordance with the invention, a light detecting device is provided comprised of a material which fluoresces when exposed to the light moving past the strip edges in combination with photoelectric sensitive means for producing and electrical signal proportional to the varying amounts of fluorescent generated energy in such material.

More specifically the device is comprised of a smooth surfaced sheet of translucent material, such as a generally clear plastic or glass, having dispersed therein a pigment which fluoresces when exposed to external radiant energy, such as light energy, to produce fluorescent generated radiant energy most of which travels between the smooth sides of the sheet material to the edges thereof where photoelectric sensitive means are provided for sensing the amount of fluorescent radiant energy generated within the sheet.

Further in accordance with the invention, the area of the sheet which is exposed to the external radiant energy is greater, for a given extent of the sheet transversely of the strip and remote from the photoelectric sensitive means or cells, than the area of the sheet exposed to such energy for a similar given extent thereof adjacent to the photoelectric cells. In other words, the surface of the sheet which is exposed to the external radiant energy decreases or converges towards the photoelectric sensitive means so that greater amounts of fluorescent radiant light energy will be produced at distances spaced from the photoelectric sensitive means thereby to compensate for the attenuation of the fluorescent radiant energy, during its travel through the sheet, due to the index of transmittance being less than one.

The principal object of the invention is the provision of a new and improved light detector which will detect the amount of light falling onto a surface with only a single photoelectric sensitive means.

Another object of the invention is the provision of a new and improved center guide detector using a radiant light source directing light onto means for creating a voltage proportional to the amount of light falling there on, wherein it is unnecessary to match photoelectric or photoresponsive cells as in the past.

Another object of the invention is the provision of a new and improved edge detector for a moving strip which is simple in construction, economical to build and positive in operation.

Another object of the invention is the provision of a new and improved edge detector for a moving strip comprised of a sheet of translucent material having interspersed throughout a fluorescent pigment, in combination with a photoelectric sensitive means associated with one or more edges of the sheet.

Another object of the invention is the provision of a new and improved detector for the transverse position of an edge of a moving strip, comprised of a sheet of translucent material having a fluorescent pigment dispersed throughout and a photoelectric sensitive means associated with an edge thereof wherein the area of the sheet to be exposed to a radiant exciting source increases with the distance of such area from the sensitive means to compensate for the attenuation of the fluorescent generated radiant energy through the sheet.

Another object of the invention is the provision of a new and improved arrangement for compensating for the attenuation of fluorescent generated radiant energy through a sheet of translucent material having fluorescent pigments dispersed therein fron a central portion of the sheet to an edge thereof.

The invention may take physical form in certain parts and arrangements of parts a preferred embodiment of which will be described in detail in this specification and illustrated in the accompanying drawing which is a part hereof and wherein.

Figure 1:
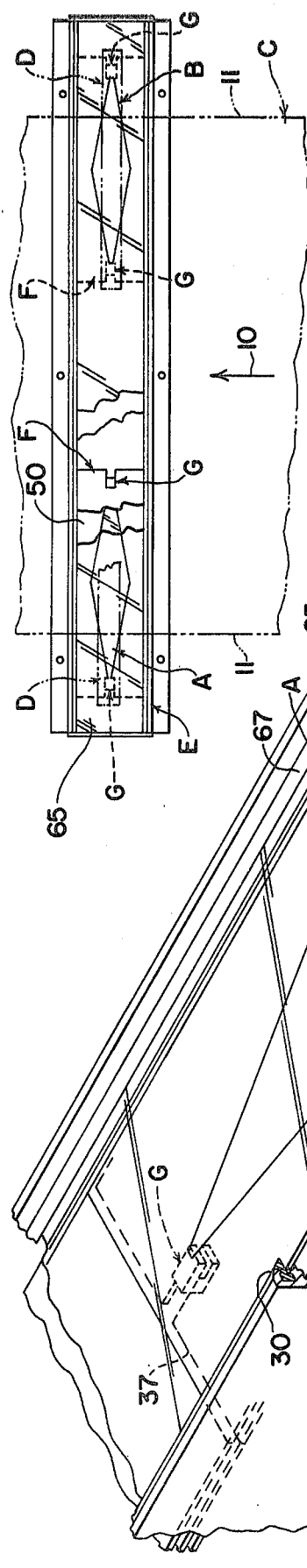
FIG. 1 is a top elevational view of a center guide detector constructed in accordance with the present invention with the energizing bar lights and a strip of moving material shown in phantom thereover and with portions of the detector broken away for the purposes of clarity.

Referring now to the drawings, wherein the showings are for the purposes of illustrating a preferred embodiment of the invention and not for the purposes of limiting same, FIG. 1 shows generally a pair of generally aligned and elongated edge detectors A, B, constructed in accordance with the invention and in phantom thereover, a sheet of moving strip material C and over the strip material a pair of elongated aligned bar type lights D.

Figure 2:
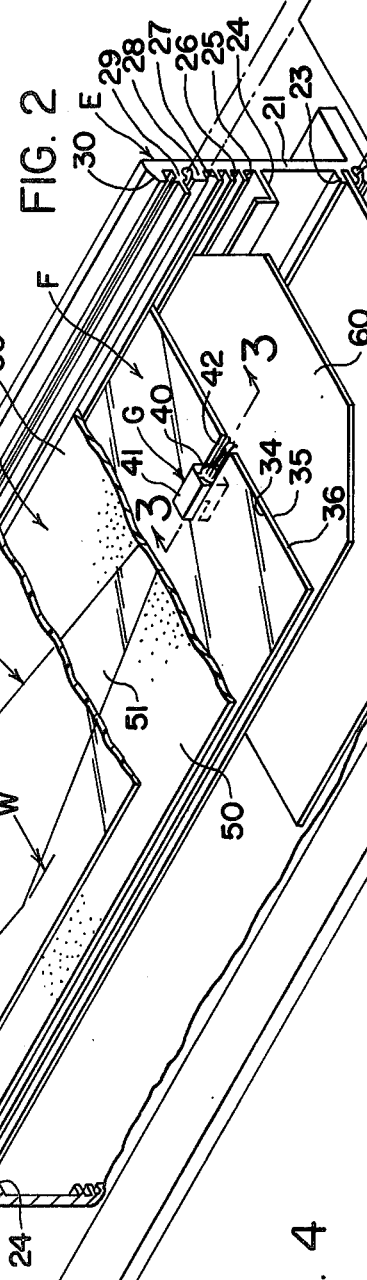
FIG. 2 is an enlarged fragmentary exploded perspective view of the detector shown in FIG. 1.

The edge type detectors A, B are identical and are shown in detail in FIG. 2. They are formed as a composite assembly comprised generally of a housing E, two sheets of either translucent or transparent material F having dispersed therethrough a fluorescent pigment; photoelectric sensitive means G operatively associated with end edges of each sheet F, and masks H positioned over the sheets F.

The material of strip C forms no part of the present invention and may be supported by any convenient means (not shown but such as power driven or idler rolls) so as to move on a longitudinal path of movement indicated generally by the arrow 10. This strip of material has spaced edges 11 which in the embodiment shown are accurately centered relative to the detectors A, B but which may, if desired, be offset relative thereto. The edges 11 in practice may be straight or slightly curved, the latter resulting sometimes in a strip of slightly varying width. The function of the detectors A, B is to sense the transverse position of the edges 11 and generate an electrical signal which may be amplified and used to actuate conventional equipment which will maintain the center of the strip in a predetermined transverse position usually centered over the detectors A, B. To this end, and as shown in FIG. 1, the two detectors A, B are respectively positioned underneath the opposite side edges 11 of the moving sheet C so as to each extend part way outwardly therebeyond.

The lights D also form no part of the present invention but as shown, are generally elongated and aligned so as to extend transversely across the width of the strip C on the opposite side thereof from the detectors A, B and in opposed alignment therewith and beyond the edges 11 of the strip. The lights D provide a source of radiant energy which may be of any desired wave length either within or out of the visible spectrum, the only requirement being that the material of strip C is at least partially opaque to the transmission of energy of such wave length. These lights D may also, as is conventional, provide either a steady source of radiant energy or a pulsating source of radiant energy at a predetermined frequency in which event the amplifiers for the electrical signals generated by the detectors A, B will be frequency sensitive so as to amplify only the electrical signals generated as a result of the radiant energy from such lights. The lights D are usually ordinary 40 watt fluorescent tubes but ordinary incandescent lamps or any other form or shape of source of radiant energy may be used, either elongated in shape or circular.

The housing E for the detectors A, B may take any desired shape or form but in the preferred embodiment is comprised of a generally U-shaped aluminum extrusion having a base 20 and a pair of upstanding side walls 21, with each side wall having on its inner surface a plurality of inwardly extending ribs (reading upwardly) 22, 23, 24, 25, 26, 27, 28, 29 and 30 which ribs provide support for the various sheets of material to be mounted within the housing E.

In particular, the ribs 22, 23 provide a support for a printed circuit board 33 on which are mounted solid state amplifiers (not shown) for the electrical signals from the photoelectric sensitive means G.

The ribs 26, 27 provide a mounting for sheet F for detector A and for sheet F for detector B. These sheets each have smooth upper and lower surfaces 34, 35; longitudinal edges which fit between ribs 26, 27 and end edges 36, 37 in which the photoelectric sensitive means G are mounted. In accordance with the invention, the sheets F are comprised of either a translucent or transparent material having dispersed therethrough a fluorescent pigment. Preferably the material from which the sheet F is manufactured is as clear as is possible to obtain, that is to say, it has an index of transmittance approaching or equalling 1, wherein the index of transmittance is the ratio of $I_I/I_O$ wherein $I_I$ is the intensity of light in on one side of the sheet and $I_O$ is the intensity of light out of the opposite side. While clear glass of various kinds meets this requirement, in the preferred embodiment the material of the sheet is an acrylic plastic manufactured by Rohm & Haas Company of Philadelphia, Pa. under the trade name "PLEXIGLAS". Such plastic material is able to have various fluorescent pigments dispersed therein which pigments when exposed to radiant energy, particularly visible light energy, such as are provided by the lights D, D, will glow and provide additional radiant energy which may be either in the visible or the invisible light spectrum. In the preferred embodiment, the fluorescent pigment within the sheet F is known as No. 2085 Fluorescent Red.

Such fluorescent materials have been described in the literature as a pigment which, when exposed to a visible light of a wide range of colors, reflects one of such colors and absorbs the other colors which absorbed colors cause the pigment to emit a light in the same wavelength as the reflected color resulting in a total emitted light of as much as 240 or 250% of the amount of the light at that wavelength which might exist in the exciting light.

Acrylic plastic sheets further have the characteristic of having a relatively high internal angle of total reflection. Thus, in a thin sheet, most of the light emitted by fluorescent pigments dispersed in such a sheet has an incident angle to the external surfaces 34, 35 greater than this angle of total reflection, so that the fluorescent generated light instead of passing through the surfaces 34, 35 is reflected internally and thus primarily moves in the plane of the sheet toward the longitudinal and end edges. These edges are perpendicular to the surfaces of the sheet and thus the incident angle of the edges is less than the total angle of reflection and the light passes outwardly of the sheet through the edges. The surfaces 34, 35 need not be planar but they must be smooth.

The fluorescent pigment within the sheet is translucent and reduces the index of transmittance of light through the sheet such that light emitted by the fluorescent pigments within the sheet spaced from the edges is attenuated as it moves towards the edges. Thus, if a square inch of the sheet spaced from the edges is illuminated with a given amount of radiant energy, the amount of fluorescent-generated radiant energy reaching an edge of the sheet will be less than the amount of such energy reaching the edge if the square inch were adjacent to the edge. This reduction in the index of transmittance and attenuation of the fluorescent generated radiant energy is provided for in accordance with the invention, as will appear.

While the word "fluorescent" is used in this specification, it is not known whether the material fluoresces in the exact and true sense or whether it scintillates, but in any event, the material of sheet F is comprised of material which when exposed to radiant energy of an appropriate wavelength generates or emits radiant energy of a different wavelength which generated or emitted energy flows or moves through the sheet between its upper and lower surfaces 34, 35 so that the amount of radiant energy generated can be detected at the edges of the sheet by photoelectric sensitive means.

Figure 3:
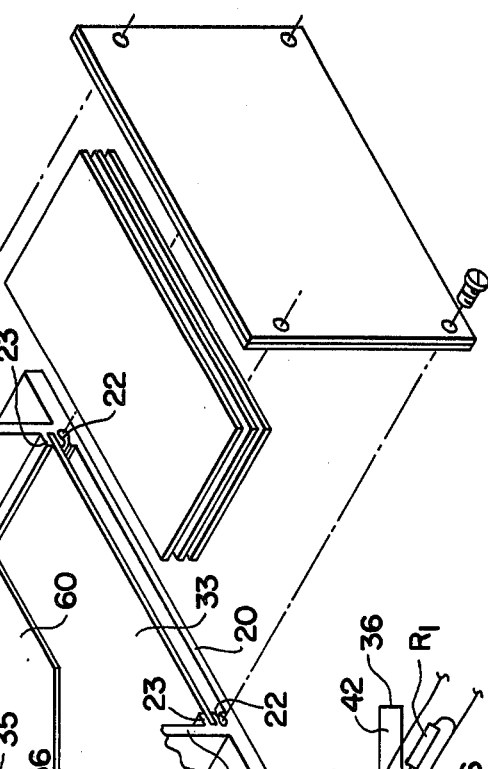
FIG. 3 is a cross sectional view of FIG. 2 taken approximately on the line 3—3 thereof; and, FIG. 4 is a block diagram of the electric circuit for amplifying the electrical signals generated within the edge detector of FIGS. 1 and 2.

In the preferred embodiment, such photoelectric sensitive means are comprised of an assembly of a phototransistor 40 mounted in a generally rectangular housing 41 with a slot therethrough within which the end edge 36 of the sheet F is received as is shown in FIG. 3. To locate the phototransistor 40 and its housing 41, the end edge 36 has a longitudinally extending notch 42 of a width just equal to the width of the housing 41.

The phototransistor 40 as shown, has base, emitter and collector connected wires 45, 46 and 47 extending therefrom with the base and collector wires being interconnected by a resistor $R_1$. The phototransistors employed in the preferred embodiment have the designation MRD 3050. There are two of such phototransistors employed with each detector A, B, one on each end edge 36, 37, generally as is shown in FIG. 2.

As heretofore indicated, the index of transmittance of the sheet F due to the presence of the pigmentation is substantially less than 1, such that any fluorescent generated radiant energy emitted within the sheet F spaced from the edges is attenuated as it passes through the sheet toward the edges and in accordance with the invention, means are provided for compensating for this attenuation such that for equal transverse movements of the strip edges 11 over the areas of the sheets F remote from as compared to nearer the phototransistor 40, greater areas of the sheet F will be exposed to the radiant energy of the lights D.

Thus, in the preferred embodiment, a mask H is provided in each of the detectors A, B having an opaque border 50 and a clear center portion or window area 51 which center portion 51 extends longitudinally over its respective sheet F and converges from a maximum width W adjacent the midpoint between the two photoelectric sensitive detectors G on each sheet F towards such detectors. In this manner, for a given transverse movement of a strip edge 11 adjacent this midpoint, a greater area of the sheet F will be exposed to light from the source D than would be the case if the edge 11 were moving over a portion of the sheet F adjacent to one or the other of the photoelectric sensitive detectors G. Greater accuracy can be obtained by curving the edges of the masking areas. Alternatively, the masks may be omitted and the sheets F shaped so as to converge toward the ends.

To further increase the sensitivity of the detectors A, B, a sheet of white acrylic plastic 60 is positioned in the grooves formed by the ribs 25, 26 such that any radiant energy from the bar lights D which should pass through the clear portion 51 of the masks H and through the sheets F will be reflected back and the total fluorescent generated radiant energy of the detectors A and B will be a maximum for a given amount of light or radiant energy from the bar lights D falling on the detectors A and B.

In the preferred embodiment, a clear acrylic sheet cover 65 is supported by rib 29 and effectively acts as a dust cover. Sealing means 67 in the form of a rubber strip seal, seals the cover 65 within the housing.

As above pointed out, the light sources D may either be a continuous source of light or may be modulated at any desired frequency. In the preferred embodiment, it is preferred that these light sources be modulated at a frequency on the order of 3 KHz. Thus, the amplifiers for the photoelectric sensitive means G comprise frequency sensitive amplifiers which will only amplify electrical signals of that frequency.

Figure 4:
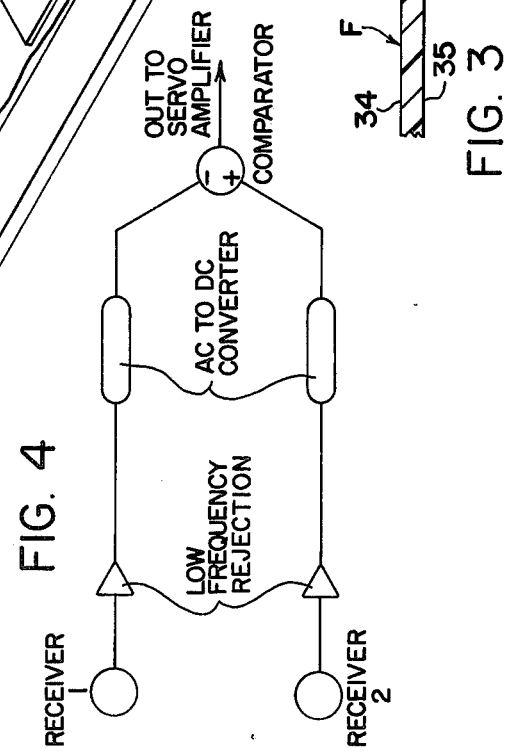

Normally, the signal from each photoelectric sensitive means G is then further amplified and, as shown in FIG. 4, converted to a constant polarity signal and then the signals from the two photoelectric sensitive means G for each detector are compared by a conventional comparator means and the resultant compared signals sent to a conventional servoamplifier.

The amplifier system for the photoelectric sensitive means G is well known in the art and will not be described further herein.

The invention has been described with reference to center guide detectors for moving strips of material wherein a pair of detectors are required, each comprised of a sheet of transparent or translucent material having dispersed therethrough a material capable of fluorescing when exposed to radiant energy such as the radiant light energy from a fluorescent tube light source. It is believed that we are the first to utilize such a sheet of material in combination with a photoelectric sensitive means on one edge of the sheet. It is believed that this combination can be used for measuring the varying amounts of incident light in uses other than strip edge detecting.

The invention has been described with reference to a preferred embodiment. Obviously, modifications and alterations will occur to others upon a reading and understanding of this specification and it is my intention to include all such modifications and alterations insofar as they come within the scope of the appended claims.

Having thus described our invention, we claim:

1. In a device for detecting the amount of radiant energy falling on a surface, said device being comprised of a smooth surfaced sheet of translucent material having uniformly dispersed therein a pigment which fluoresces when exposed to exciting radiant energy, at least a portion of the radiant energy from such fluorescence travelling between the surfaces of said sheet to the edges thereof, and photoelectric sensitive means operatively associated with an edge of said sheet for actuation by the radiant energy emitted therefrom to provide an electrical signal which can be amplified, the shape of the surface area of said sheet exposed to the said exciting radiant energy being such as to compensate for the attenuation of the passage of the fluorescent radiant energy through the sheet toward the said photoelectric sensitive means.

2. The device of claim 1 wherein said sheet is elongated in one direction and said photoelectric sensitive means are associated with at least one transverse edge of said sheet, the shape of the surface area of the sheet exposed to the said exciting radiant energy converging toward said photoelectric sensitive means.

3. The device of claim 1 wherein said sheet is elongated in one direction and said photoelectric sensitive means are associated with opposite transverse edges of said sheet, the shape of the surface area of the sheet exposed to the said exciting radiant energy converging from the middle of the longitudinal length of said sheet towards both said photoelectric sensitive means.

4. The device of claim 1 wherein said sheet is elongated in one direction and in the shape of a rectangle and said photoelectric sensitive means are associated with at least one transverse edge of said sheet, and a mask is disposed over the surface of said sheet facing toward said exciting radiant energy, said mask having a radiant energy passing window area having edges which converge towards said photoelectric sensitive means.

5. The device of claim 3 wherein the said sheet is in the shape of a rectangle and a mask is provided thereover having a radiant energy passing window area exposing a maximum width of said sheet adjacent the midpoint thereof, said mask window area converging in both directions towards said photoelectric sensitive means.

6. The device of claim 5 wherein the edges of said mask window area define a flattened diamond-shaped configuration extending longitudinally of said elongated sheet.

7. In a detector for detecting the transverse position of an edge of a moving strip of sheet material wherein an elongated source of exciting radiant energy is arranged on one side of the strip so as to radiate energy both onto the said one side of said strip and past said edge, said detector being positioned on the opposite side of said strip and having a surface adapted to be exposed to the said exciting radiant energy moving past said edge in amounts which increase and decrease as the position of the edge moves laterally, the improvement which comprises: said detector being comprised of: a sheet of translucent material containing pigments which fluoresce when exposed to the said exciting radiant energy to produce within said sheet fluorescent radiant energy, at least a portion of such fluorescent radiant energy travelling between the surfaces of said sheet to the edges thereof; and, photoelectric sensitive means operatively associated with an edge of said sheet for acuation by the radiant energy emitted therefrom to provide an electrical output signal, the shape of the surface area of said sheet exposed to the said exciting radiant energy being such as to compensate for the attenuation of the fluorescent created radiant energy through the sheet towards the said photoelectric sensitive means.

8. The improvement of claim 7 wherein the shape of the surface area of the sheet exposed to said exciting radiant energy as it moves past said strip edge converges towards said photoelectric sensitive means.

9. The improvement of claim 7 wherein said sheet is elongated in a direction transverse to and has spaced end edges generally parallel to the line of movement of said strip edges and said photoelectric sensitive means are associated with each of said sheet edges, the shape of the surface area of the sheet adapted to be exposed to the said exciting radiant energy converging from a maximum width adjacent the middle of said sheet towards each of said photoelectric sensitive means.

10. Apparatus for detecting and controlling the transverse position of the side edges of a moving strip of sheet material comprising elongated radiant energy source means arranged at one flat side of the strip and extending transversely thereof so as to direct exciting radiant energy both onto the said one strip side and past said edges, a pair of elongated light detectors positioned at the opposite flat side of said strip in longitudinally aligned relation extending transversely of said strip and in opposed aligned relation to said radiant energy source means, said detectors being located opposite the respective side edges of said strip so as to partly overlap and partly extend outwardly beyond the respective side edges, said light detectors each comprised of a sheet of light-transmissive material elongated in a direction transverse to the line of movement of said strip edges and having dispersed therein a pigment which fluoresces when exposed to the said exciting radiant energy to produce within said sheet fluorescent radiant energy traveling between the flat surfaces of said sheet to and exiting from the edges thereof, separate photoelectric sensitive means operatively associated with an edge of respective ones of said sheets for actuation by the radiant energy emitted from the said sheet edges to generate respective electrical signals proportionate in magnitude to the amount of exciting radiant energy impinging on the respective sheets, and electrical signal comparator means electrically connected to and operative to compare the electrical signals generated by the said photoelectric sensitive means and transmit them to a servo-amplifier for amplification and transmittal to strip position control means.

11. Apparatus as specified in claim 10 wherein the said photoelectric means are associated with at least one transverse edge of respective ones of said sheets.

12. Apparatus as specified in claim 10 wherein a separate pair of said photoelectric transistor means are associated with opposite transverse edges of each respective one of said sheets and said electrical signal comparator means is operative to compare the signals from the two photoelectric sensitive means for each of said detectors.

* * * * *